United States Patent
Cerqueira

(10) Patent No.: US 9,393,490 B2
(45) Date of Patent: Jul. 19, 2016

(54) SIMULATION BASED ON AUDIO SIGNALS

(71) Applicant: International Business Machines Corporation, Armonk, NY (US)

(72) Inventor: Alexandre G. Cerqueira, Pocos de Caldas (BR)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/252,068

(22) Filed: Apr. 14, 2014

(65) Prior Publication Data

US 2015/0290533 A1  Oct. 15, 2015

(51) Int. Cl.
A63F 9/00 (2006.01)
A63F 13/215 (2014.01)
A63F 13/28 (2014.01)

(52) U.S. Cl.
CPC .............. A63F 13/215 (2014.09); A63F 13/28 (2014.09)

(58) Field of Classification Search
None
See application file for complete search history.

(56) References Cited

U.S. PATENT DOCUMENTS

| | | | |
|---|---|---|---|
| 5,547,382 A | 8/1996 | Yamasaki et al. | |
| 5,857,917 A | 1/1999 | Francis et al. | |
| 5,868,573 A | 2/1999 | Kerby et al. | |
| 6,327,889 B1 | 12/2001 | Seltzer et al. | |
| 2002/0032553 A1 | 3/2002 | Simpson et al. | |
| 2007/0287139 A1 | 12/2007 | Holm | |
| 2008/0153591 A1* | 6/2008 | Deligiannidis | G06F 3/011 463/31 |
| 2009/0156307 A1 | 6/2009 | Aguirre et al. | |
| 2009/0186705 A1* | 7/2009 | Roberts | A63F 13/00 463/47 |
| 2011/0111846 A1* | 5/2011 | Ciarrocchi | A63F 13/08 463/30 |
| 2012/0078420 A1 | 3/2012 | Jensen et al. | |
| 2015/0119122 A1* | 4/2015 | Holme | A63F 13/02 463/7 |

OTHER PUBLICATIONS

Sparrow et al., "An Audio Reproduction Grand Challenge: Design a System to Sonic Boom an Entire House", Audio Engineering Society, Convention Paper 7607, Presented at the 125th Convention Oct. 2-5, 2008 San Francisco, CA, USA, pp. 1-10.
"Audio DC Motor Speed Control using PWM", Audio Circuits, Jul. 10, 2011, pp. 1-5, <http://audio.circuitlab.org/2011/07/audio-dc-motor-speed-control-using-pwm.html>.
"Speed Simulator for racing games or coaster simulators", by sharkyenergy, Instructables—Share What You Make, pp. 1-23, provided on search report May 17, 2012, <http://www.instructables.com/id/Speed-simulator-for-racing-games-or-coaster-simula/>.

* cited by examiner

*Primary Examiner* — Seng H Lim
(74) *Attorney, Agent, or Firm* — Isaac J. Gooshaw

(57) ABSTRACT

Embodiments of the present invention disclose an apparatus, a method, and a computer program product for coordinating sensations of sound and gas flow based on audio signals. An apparatus comprises a controller circuit which is in communication with a gas blowing unit and a speaker. The controller circuit is operatively connected to an audio source of an entertainment device, and is configured to a) receive an audio input, b) amplify a portion of a peak that is above a pre-determined threshold, and c) send a signal that activates the gas blowing unit.
A method and computer program product where a computer receives an audio input. The computer determines that the amplitude of a portion of the audio input exceeds a pre-determined threshold. In response, the computer amplifies the determined amplitude, and sets the speed for a fan based on the audio input.

20 Claims, 4 Drawing Sheets

SIMULATION BASED ON AUDIO SIGNALS

BACKGROUND

The present invention relates generally to the field of games and amusement devices, and more particularly to coordinating sound and air flow based on audio signals.

Video games and simulations are enjoyed by adults and children alike, both in the arcade and home environments. Expensive arcade racing or flight simulators can be large enough to fill a whole room. Many arcades have simulators for car racing or flight with full-sized cockpit seats, panoramic screens, and powerful sound systems. Typically, the more senses that are engaged, the more realistic the experience can be for a patron. For example, move and tilt simulators can physically move the user in directions that create the sensation of turning left or right, accelerating or braking. A variety of sensations can be used to create illusions that add a dimension of realism to the simulator. For example, vibrations from a vibration motor can be used to create illusions of driving over bumps or explosions. In the more expensive simulators, multiple senses of simulator patrons are engaged to create realistic experiences.

As stunning graphics, intricate storylines, and new physics engines are gaining popularity in video games, a greater emphasis is being placed on providing realism. In the home environment, video games are often played on video game consoles, or on personal computers. Home video game racing simulators often attempt to provide the illusion of speed using two of the five main senses, namely sight and sound. The display of fast moving landscapes that seem to be coming towards the player and the sound coming from a speaker can create a crude illusion of speed and movement. For example, the motion of turning corners may be created by moving the vanishing point in the graphical display from side to side and adding sound effects such as revving engines and squealing tires. The brain accepts the cues provided by the combined output of the display and speakers, forming a simulation of motion.

SUMMARY

Embodiments of the present invention disclose an apparatus for coordinating sensations of sound and gas flow based on audio signals. An apparatus comprises a controller circuit which is in communication with a gas blowing unit and a speaker. The controller circuit is operatively connected to an audio source of an entertainment device, and is configured to a) receive an audio input from the audio source, b) amplify a portion of a peak of the audio input that is above a pre-determined threshold, and c) send a signal that activates the gas blowing unit based on the amplified portion of the peak, such that the activation of the gas blowing unit results in a flow of gas of a first speed detectable by a user of the entertainment device.

Embodiments of the present invention disclose a method and computer program product for coordinating sensations of sound and gas flow based on audio input. A computer receives an audio input from an audio source, wherein the audio input includes an amplitude. The computer determines that the amplitude of a portion of the audio input exceeds a pre-determined threshold. In response, the computer amplifies the determined amplitude of the portion of the audio input that is above the pre-determined threshold, and the computer sets the speed for at least one fan to a first value, wherein the first value is based, at least in part, on the amplified amplitude of the portion of the audio input.

DETAILED DESCRIPTION

Figure 1:
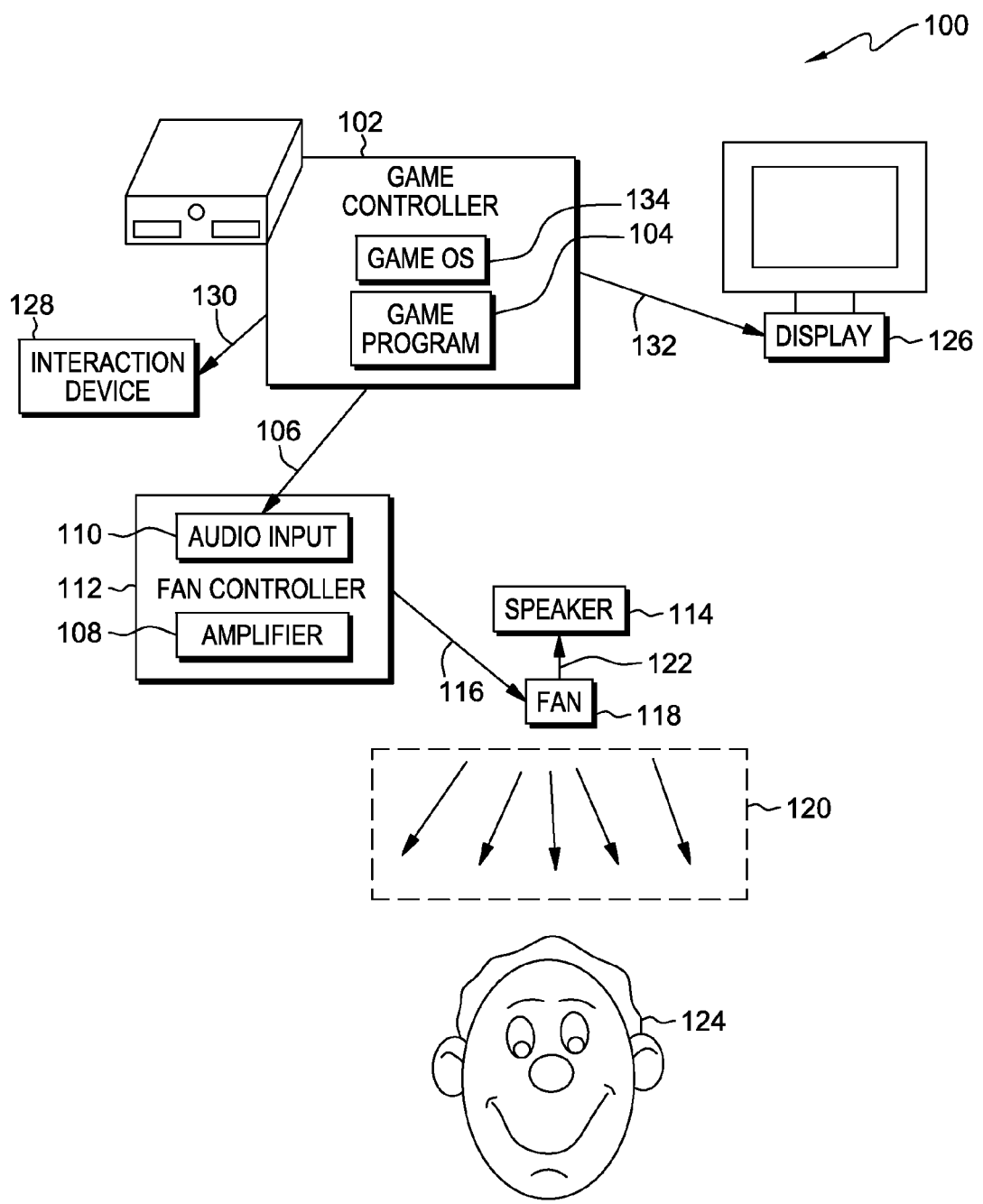
FIG. 1 is a functional block diagram illustrating a gaming system with a variety of components, in accordance with an embodiment of the present invention.

Simulators attempt to reproduce the physical sensations experienced in life, such as driving a vehicle. Trying to produce these sensations in the home environment is costly, and can consume a lot of space. Embodiments of the present invention recognize that less expensive and smaller component simulators are needed to create a home experience similar to the arcade environment. A successful simulation creates immersion, which is a sensation experienced by a user of being immersed in the virtual world presented by the simulation. Providing additional, coordinated sensory feedback enhances immersion. For example, a virtual experience may be enhanced by the coordinated sensations of sound and air flow to help emulate the speed of a simulated race car, or the blast of a simulated explosion presented in a video game. Such a simulation creates additional realism by providing tactile sensations to the user. For example, a flow of air can simulate speed as air flows over the skin. In another example, the airflow, such as a strong puff of air, can simulate contact with an object. This can simulate contact between the player's vehicle and an object such as a garbage can.

Embodiments of the present invention provide for a simulation system which synchronizes the flow of air toward a player with the audio output from a video game or simulator. Various embodiments of the present invention propose a component of a home entertainment system comprising an audio speaker, a fan or other air blowing unit, a control circuit with audio input, and a power source. Implementation of embodiments of the invention may take a variety of forms, and exemplary implementation details are discussed subsequently with reference to the figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the figures. FIG. 1 is a functional block diagram illustrating a gaming system, generally designated 100, with a variety of components for simulating speed based on audio signals, in accordance with an embodiment of the present invention. Typical gaming systems comprise a game console with a variety of user interface devices or peripheral devices which allow a user to interact with a game which is comprised of software being executed by a computerized game controller. Gaming system 100 includes game controller 102, display 126, interaction device 128, speaker 114, fan controller 112, and fan 118.

In an alternate embodiment, gaming system 100 may be a home entertainment system, and game controller 102 may be a component of the home entertainment system including, but not limited to, a television, a stereo receiver or amplifier, a DVD player, a Blu-Ray Disc player, or other device capable of providing audio output. Gaming system 100 includes game controller 102, speaker 114, fan controller 112, and fan 118 allowing simulation of speed or explosions while watching a video, a movie, or other media in the home entertainment environment.

In the illustrative embodiment of FIG. 1, game controller 102 may be a server computer, a game console, a laptop computer, a tablet computer, a netbook computer, a personal computer (PC), a desktop computer, a personal digital assistant (PDA), a smart phone, or any programmable electronic device capable of communicating with user 124 via display 126, interaction device 128, speaker 114, and fan 118. In general, game controller 102 is representative of any programmable electronic device or combination of programmable electronic devices capable of executing machine-readable program instructions. In some embodiments, game controller 102 is capable of communicating with other computing devices via a network (not shown). Game controller 102 may include any general purpose computer capable of supporting a variety of gaming system software. Game controller 102 may be optimized for cost-effectiveness in gaming applications or may contain other special-purpose elements yet retain the ability to load and execute a variety of gaming software. Game controller 102 may include internal and external hardware components, as depicted and described in further detail with respect to FIG. 4.

Game controller 102 comprises software and hardware which together control the various connection interfaces to the various interface devices, such as interaction device 128, display 126, speaker 114, and fan 118, and which are necessary to facilitate interaction between gaming system 100 and user 124. Game controller 102 is connected to the various devices via one or more electrical connectors such as connectors 106, 130, and 132. Game controller 102 includes an operating system, such as game OS 134, and game program 104.

In various embodiments of the present invention, game controller 102 includes an instance of game OS 134. Game OS 134 may be specialized for gaming systems, including several layers of software code, such as a game engine layer. The operating system of game controller 102 may be unique to the maker of game controller 102 such as on a game console. In another embodiment, game OS 134 may be commercially available such as a general-purpose operating system on a personal computer running game program 104. In one embodiment, game OS 134 includes specialized software for amplifying the audio signal received from game program 104. The amplified signal may be transmitted to fan 118 via fan controller 112. In another embodiment, the amplified signal may be transmitted from game controller 102 to fan 118 directly (not shown) with a connector similar to connector 106, thus eliminating the need for fan controller 112. In this case, game controller 102 includes the logic and functionality described herein with respect to fan controller 112.

In various embodiments of the present invention, game controller 102 includes an instance of game program 104. In the depicted environment, game program 104 is a computer program executable on game controller 102. Game program 104 may be stored on a game cartridge, a compact-disc, a DVD, a hard drive, or other computer-readable storage medium connected to or residing in game controller 102. Game program 104 may receive additional code downloaded or streamed from a server computer over the internet (not shown). Game program 104 may rely on a game engine layer within game OS 134 to provide commonly used gaming functions. In an alternate embodiment, one or both of game program 104 and game OS 134 includes specialized software for controlling one or both of fan controller 112 and fan 118.

In the depicted environment, game controller 102 uses a device, such as interaction device 128, to receive user input, and in some cases to output responses to a user. In various embodiments of the invention, interaction device 128 includes components used to receive input from a user and transmit the input to game program 104 residing on game controller 102. In an embodiment, interaction device 128 uses a combination of technologies and devices, such as device drivers, to provide a platform to enable user 124 to interact with game program 104. In various embodiments, interaction device 128 receives input, such as a selection from a list of items, the selection received from a physical input device, such as a joystick, mouse, simulated steering wheel, foot pedals, a hand-held remote, or a hand-held controller via a device driver which corresponds to the physical input device. Interaction device 128 may be integrated into game controller 102, as in the case of tablets, hand-held game consoles, and other mobile gaming devices. In alternate embodiments, interaction device 128 may be a camera with motion detection software allowing input from the physical motion of user 124. Connector 130 connects game controller 102 with interaction device 128. In some embodiments, interaction device 128 may comprise more than one of the mentioned devices, and associated electrical connections.

Display 126 may be a liquid crystal display (LCD) panel, plasma display, light-emitting diode (LED) display, a smart TV, or other display device which produces a visual image under control of game controller 102. Display 126 may be integrated into game controller 102, as in the case of tablets, hand-held game consoles, and other mobile gaming devices. Connector 132 connects game controller 102 with display 126. Connector 132 conveys video signals from game controller 102 to display 126 through connectors including, but not limited to RCA, HDMI, mini-DIN, VGA, BNC, TV aerial plug, and S-Video. Connector 132 may also convey audio signals from game controller 102 to display 126 through such connectors. Display 126 may include one or more audio output devices for producing audio based on the audio signals conveyed by connector 132. Alternatively, game controller 102 may convey audio signals to one or more amplifiers (not shown), speakers (not shown) or speaker systems (not shown) for producing audio based on the conveyed audio signals.

Fan controller 112 is a circuit board controller card which amplifies the pulse peaks of an audio signal received via connector 106 at audio input 110. Fan controller 112 receives the audio signal output from game controller 102 via connector 106, which was provided by game program 104. In various embodiments, fan controller 112 utilizes specialized hardware, such as amplifier 108, in the form of a controller circuit or programmable logic on a circuit board, or other specialized semiconductor device, configured to amplify the pulse peaks of a received audio signal. In other embodiments of the present disclosure, game controller 102 uses specialized software within game OS 134, game program 104, or a combination thereof, in place of the specialized hardware in fan controller 112 to activate or control fan 118 directly. Fan controller 112 synchronizes the fan speed of fan 118 with audio signal peaks output by game controller 102 and provided by game program 104.

Connector 106 connects game controller 102 to fan controller 112 through audio input 110. Audio input 110 receives audio input from connector 106. Connector 106 may be a digital or analog wired connection, such as a 3.5 mm audio cable, or a wireless digital connection, such as a Bluetooth® connection. The Bluetooth® word mark is a registered trademark owned by Bluetooth SIG, Inc. Using a wireless connection makes the fan and speaker assembly more portable. Alternatively, connector 106 represents a microphone that receives audio output of one or more speakers transmitting an audio signal through the air (e.g., speaker 114). Connector 106 may be an audio connector including, but not limited to, speaker wire, a USB cable, audio cables such as P1, P2, or P10, a simple microphone, a Bluetooth® mono audio microphone, a microphone from a webcam, or any connector capable of conveying an audio signal.

Fan 118 provides a flow of air in output 120 toward user 124. Output 120 represents air space between fan 118 and user 124. In the illustrative embodiment, fan 118 may be any fan with or without rotating blades, or other device capable of creating the feeling of "air displacement" through air flow over the skin, or cooling of the skin of user 124. In an alternate embodiment, fan 118 may comprise an air compressor or air tank, various valves, and pipes assembled together for producing a current of air directed toward user 124. Fan speed or air speed changes are synchronized with audio signal peaks received from fan controller 112 via connector 116. The fan speed or air flow speed of fan 118 may start out at a low default speed, increase with the leading edge of each amplified peak of the received audio signal, and then decrease back to the default low fan speed with the trailing edge of each amplified peak of the audio signal. The changing fan speed creates the feeling of "air displacement" for user 124 to simulate the sensations of speed or explosions.

Connector 116 connects fan controller 112 to fan 118. Connector 116 may be a connector or cable capable of conveying both an audio signal and fan speed signals to fan 118.

In the illustrative embodiment of FIG. 1, fan 118 is shown directly in front of speaker 114, and may be partially or fully integrated into the assembly of speaker 114. Fan controller 112 may be partially or fully integrated into the assembly of speaker 114, the assembly of fan 118, or a combination thereof. In other embodiments, fan 118 and fan controller 112 may be physically separate from speaker 114 and/or each other. Fan 118 and speaker 114 both require a power supply (not shown), which may be integrated into the assembly. In some embodiments, the functionality described herein with respect to fan controller 112 is performed by software components within game OS 134 or game program 104.

Speaker 114 provides sound to user 124, and may be used to communicate with user 124, to indicate game status, to indicate game action, or for other purposes under the control of game controller 102 and game program 104. In one embodiment, connector 122 connects fan 118 to speaker 114 and conveys an audio signal to speaker 114. For example, fan controller 112 transmits an audio signal to fan 118 over connector 116, and then fan 118 transmits the audio signal to speaker 114 via connector 122. In an alternate embodiment, an audio connector (not shown) connects game controller 102 to speaker 114, and conveys the audio signal to speaker 114 while connector 106 conveys the same audio signal from game controller 102 to audio input 110 on fan controller 112. Connector 122 and the alternate audio connector are electrical connectors including, but not limited to, speaker wire, a USB cable, audio cables such as P1, P2, or P10, any connector capable of conveying an audio signal, or a wireless audio connection, such as a Bluetooth® connection.

Embodiments of the present invention provide an apparatus and method for simulating speed sensation based on audio signals. The speed sensation may include the feeling of acceleration and deceleration such as within racing simulations, or may include the feeling of air speed changes such as within a movie or game involving explosions or crashes. Fan controller 112 outputs a fan speed to fan 118 based on audio signal peaks output from game controller 102, which is executing game program 104. The change in fan speed of fan 118 results in a flow of gas or air that is detectable by user 124 of game program 104. Various embodiments of the present invention propose a simulator comprising speaker 114, fan 118 or other air blowing unit, a controller circuit such as fan controller 112, a power source, audio input 110, connector 106 and an audio signal. For example, when user 124 is watching a movie or playing a game and an explosion occurs, the fan speed of fan 118 is increased to full speed during the increasing height of a sound peak and then decreased back to a default low speed as the peak height decreases down to a threshold level, to give user 124 the simulated effect of "gas displacement" in the face during the explosion.

Figure 2:
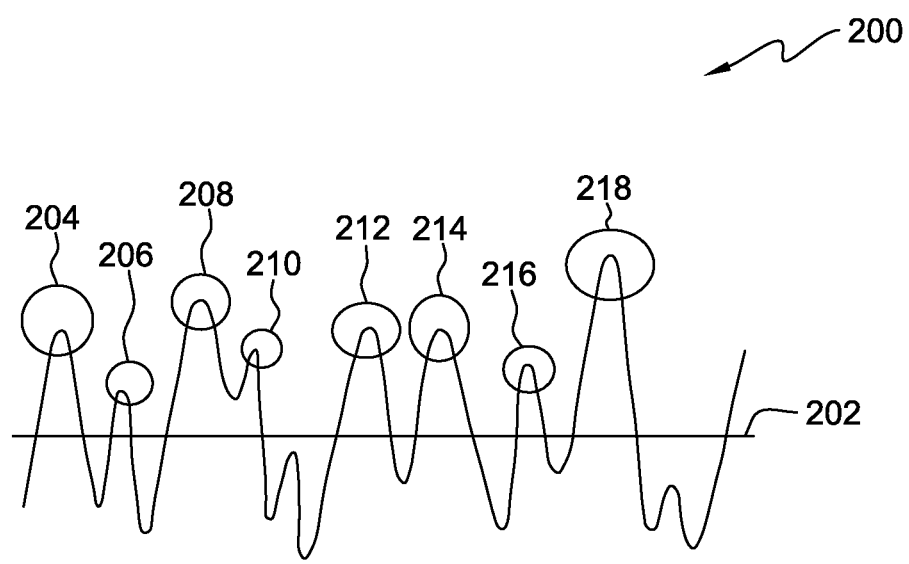
FIG. 2 is an illustration of an audio signal, in accordance with an embodiment of the present invention.

FIG. 2 is an illustration of an audio signal, generally designated 200, in accordance with an embodiment of the present invention. In the illustrative embodiment, game program 104 running on game controller 102 produces an audio signal, such as audio signal 200, which is transmitted by game controller 102 to audio input 110 of fan controller 112 via connector 106. Audio signal 200 is processed by fan controller 112, transmitted to fan 118 via connector 116, and then transmitted to speaker 114 via connector 122.

Audio signal 200 is represented by a standard sine-wave pattern with peaks and valleys, where the height of the peak indicates amplitude, and the width of the peak indicates duration. As depicted, audio signal 200 includes several peaks, e.g., peaks 204, 206, 208, 210, 212, 214, 216, and 218. The horizontal line represents threshold 202 of audio signal 200, which may be used to determine the peak height at which fan 118 takes some action, such as turning on or off, or increasing or decreasing speed. The height of peak 204 is higher than peak 206, and lower than peak 208. The height of the peak may be correlated to a speed to which fan 118 is set. The relationship between peak height and fan speed may be determined by hardware or software logic within fan controller 112, game OS 134, game program 104, or a combination thereof.

In one embodiment, fan controller 112 sets a speed for fan 118 to an initial speed. Responsive to determining that audio signal 200 exceeds threshold 202, fan controller 112 increases the speed of fan 118 based on an increasing amplitude of a peak in audio signal 200. Responsive to determining that audio signal 200 no longer exceeds threshold 202, fan controller 112 sets the speed for fan 118 back to the initial speed. In some embodiments, fan 118 is off at the start of game program 104. In such an embodiment, when a peak is reached in audio signal 200, fan 118 is turned on for a short burst of air at the start of a peak, and then turned off again at the end of a peak. The beginning and end of a peak can be identified using a threshold that is at or below threshold 202 and is above a baseline audio signal. The peak height or amplitude above threshold 202 may correlate to the fan speed, such that higher peaks create higher fan speeds. In other embodiments, the fan speed may only switch between a low default speed, and a maximum full speed.

In some embodiments, fan controller 112 transmits audio signal 200 to speaker 114. Alternatively, fan controller 112 may transmit audio signal 200 to speaker 114 only while the amplitude of audio signal 200 exceeds threshold 202. Once the amplitude of audio signal 200 drops below threshold 202, fan controller 112 may cease to transmit audio signal 200 to speaker 114. In various embodiments, fan controller 112 may transmit audio signal 200 to speaker 114 via fan 118 and connector 122, or directly via a connector (not shown) that connects fan controller 112 to speaker 114. Fan controller 112 may include an amplifier, e.g., amplifier 108, in order to boost the power of a portion of audio signal 200 prior to transmitting audio signal 200 to speaker 114, for example by increasing the amplitude of audio signal 200.

In an alternate embodiment, game controller 102 transmits audio signal 200 to audio input 110 of fan controller 112 via connector 106, and to speaker 114 via an audio connector (not shown). Game controller 102 transmits audio signal 200 to both connector 106 and the audio connector. In one embodiment, game controller 102 transmits audio signal 200 directly to speaker 114 without amplification. In other embodiments, amplification of audio signal 200 may occur within game OS 134, or game program 104 before transmission to speaker 114 via the audio connector (not shown). Alternatively, game controller 102 may include a hardware amplifier, e.g., amplifier 108, for amplifying audio signal 200. Game controller 102 may delay transmission of audio signal 200 to speaker 114 by the processing time of fan controller 102. The delay synchronizes the sound peaks of audio signal 200 with the fan speed changes for effective realism.

Figure 3:
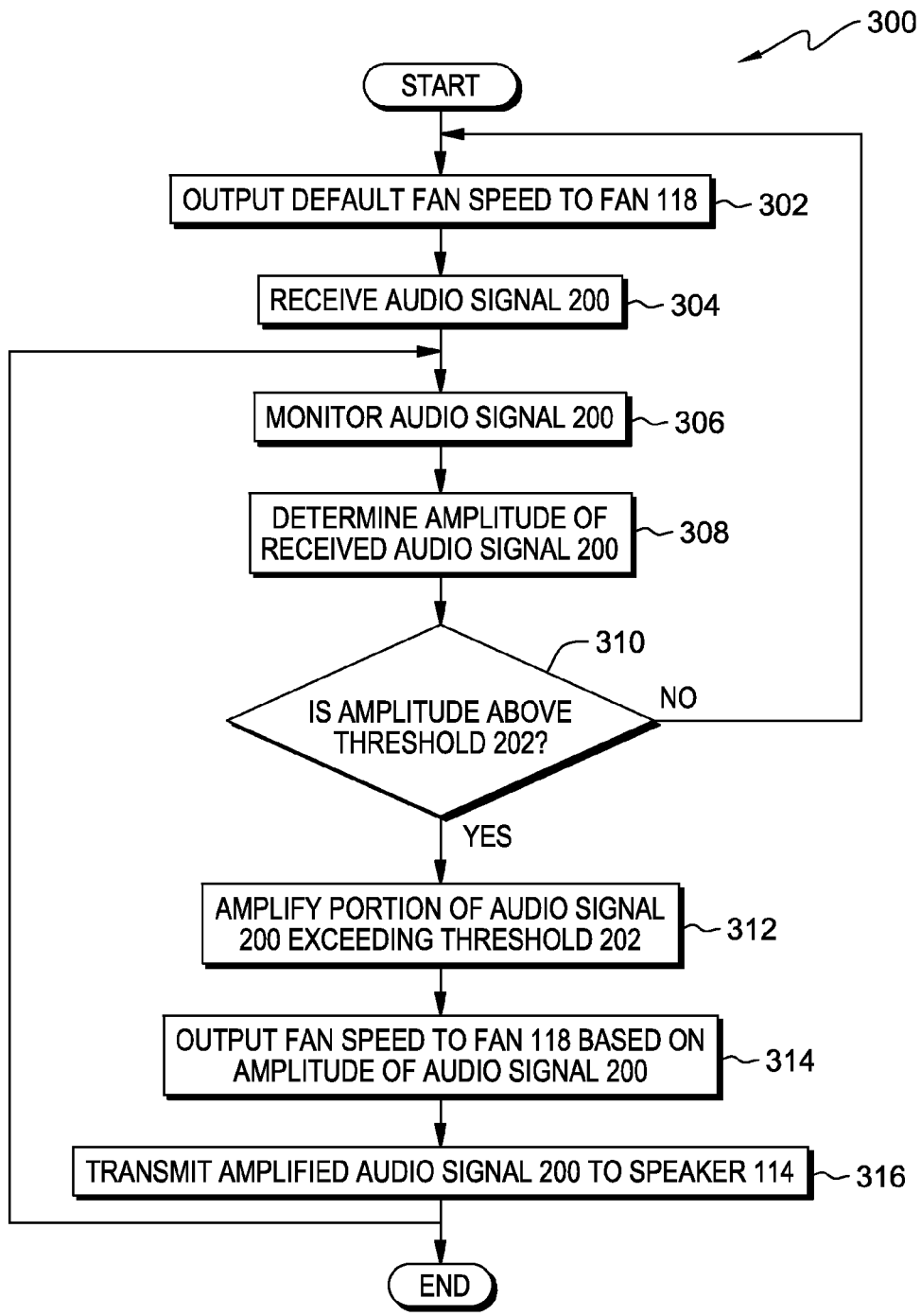
FIG. 3 is a flowchart illustrating a method for simulating speed based on audio signals, in accordance with an embodiment of the present invention.

FIG. 3 is a flowchart illustrating a method for simulating speed based on audio signals, in accordance with an embodiment of the present invention. Fan controller 112 performs method 300 through programmable logic which may include combinations of special purpose hardware and/or computer instructions.

Fan controller 112 outputs a default fan speed to fan 118 (step 302). Before processing the first portion of an audio signal, such as audio signal 200, fan controller 112 sends a signal to fan 118 via connector 116 to set the initial fan speed. This may be zero, or a low fan speed which is either hardwired into the digital logic of fan controller 112, or controlled by settings within game program 104 or game OS 134.

Fan controller 112 receives audio signal 200 (step 304). Fan controller 112 receives audio signal 200 through audio input 110 from game controller 102 via connector 106. Game program 104 creates a soundtrack in the form of audio signal 200 based on actions happening within game program 104. The soundtrack may include sounds such as accelerating race cars, screeching of brakes, crashing into walls, various types of explosions, and other sound effects. Fan controller 112 receives audio signal 200 while user 124 interacts with game program 104 through various devices, such as interaction device 128 and display 126.

Fan controller 112 monitors audio signal 200 (step 306). Fan controller 112 processes the currently received portion of audio signal 200. In one embodiment, this process is continuous. Steps 306, 308, 310, 312, 314, and 316 will continue in a loop until audio signal 200 ends. For example, fan controller 112 may continuously determine whether the amplitude of audio signal 200 exceeds the pre-determine threshold. Fan controller 112 thereby continually identifies peaks and peak heights of portions of audio signal 200.

Fan controller 112 determines amplitude of received audio signal 200 (step 308). Fan controller 112 determines the peak height of the portion of audio signal 200 currently processing through the digital logic of fan controller 112.

Fan controller 112 determines if the amplitude of audio signal 200 is above threshold 202 (decision block 310). Fan controller 112 uses hardware, software, or a combination thereof to identify if the peak height is above threshold 202. In some embodiments, fan controller 112 determines whether the amplitude of a portion of audio signal 200 exceeds a pre-determined threshold value, such as threshold 202. In such embodiments, a peak is a contiguous portion of audio signal 200 in which the amplitude of audio signal 200 exceeds the pre-determined threshold value.

If fan controller 112 determines that the amplitude of the portion of audio signal 200 does not exceed threshold 202 (no branch, decision block 310), then fan controller 112 outputs a default fan speed to fan 118 (step 302). A person skilled in the art will recognize there are many ways to identify peaks within an audio signal above a specified threshold.

If fan controller 112 determines that the amplitude of the portion of audio signal 200 exceeds threshold 202 (yes branch, decision block 310), then fan controller 112 amplifies the portion of audio signal 200 that exceeds threshold 202 (step 312). Fan controller 112 uses hardware, such as amplifier 108, software, or a combination thereof to amplify a portion of audio signal 200. In the illustrative example of FIG. 2, fan controller 112 amplifies the portions of peaks 204, 206, 208, 210, 212, 214, 216, and 218, where the peak height is above threshold 202. The portion of audio signal 200 is amplified by a factor determined to overcome the additional sound generated by the activation of fan 118. In some embodiments, a sound sensor may be located near fan 118 and connected to fan controller 112 to provide self-correction of the factor of amplification. A person skilled in the art will recognize there are many ways to amplify peaks within an audio signal.

Fan controller 112 outputs a fan speed to fan 118 based on the amplitude of audio signal 200 (step 314). Fan controller 112 sends a signal to fan 118 via connector 116 to set a fan speed. The fan speed is scaled in relation to the difference between the audio signal and threshold 202. A greater audio signal above threshold 202 is related to a faster fan speed. If the amplitude is higher than the previous portion of audio signal 200, then fan controller 112 increases fan speed, at least until the maximum fan speed is reached. If the amplitude is lower than the previous portion of audio signal 200, then fan controller 112 decreases fan speed.

Fan 118 transmits amplified audio signal 200 to speaker 114 (step 316). In one embodiment, speaker 114 receives amplified audio signal 200 via connector 122, and issues the associated sound for user 124. The amplified peaks of audio signal 200 make the sound louder during the peaks in audio signal to overcome the noise from fan 118 associated with the higher fan speed thereby providing a level of perceived sound effects to the user that is essentially that same as would be heard without the fan being active. Sending amplified audio signal 200 to speaker 114 facilitates synchronizing the sound with the fan speed changes during the simulation.

In another embodiment, fan controller 112 amplifies audio signal 200 and transmits audio signal 200 directly to speaker 114. For example, fan controller 112 may amplify and transmit audio signal 200 to speaker 114 via a connector (not shown).

In other embodiments, fan controller 112 transmits audio signal 200 to speaker 114 without amplifying audio signal 200. For example, fan controller 112 transmits audio signal 200 without amplification to speaker 114, which includes an amplifier that amplifies audio signal 200. Alternatively, fan controller 112 may transmit audio signal 200 to speaker 114 without amplification if audio signal 200 is sufficiently powerful to operate speaker 114. For example, game controller 102 may amplify audio signal 200, or connection 106 may include an amplifier (not shown).

In an alternate embodiment, game controller 102 transmits the original unamplified audio signal 200 directly to speaker 114 via a connector (not shown). Game controller 102 transmits audio signal 200 to both speaker 114 and audio input 110. Game controller 102 may transmit audio signal 200 to speaker 114 with a slight delay compared to audio input 110 to account for processing time within fan controller 112. The sound and air flow produced from audio signal 200 is synchronized for the effect of simulation.

In another embodiment, game controller 102 amplifies audio signal 200 and transmits audio signal 200 directly to speaker 114 via a connector (not shown). In that embodiment, game controller 102 may also transmit fan speed changes directly to fan 118 via a connection between game controller 102 and fan 118 (not shown).

Responsive to fan controller 112 transmitting audio signal 200 to speaker 114, fan controller 112 monitors audio signal 200 (step 306). Fan controller 112 continues to monitor audio signal 200 and raises or lowers fan speed based on peak height above threshold 202. This continues until audio signal 200 ends.

Figure 4:
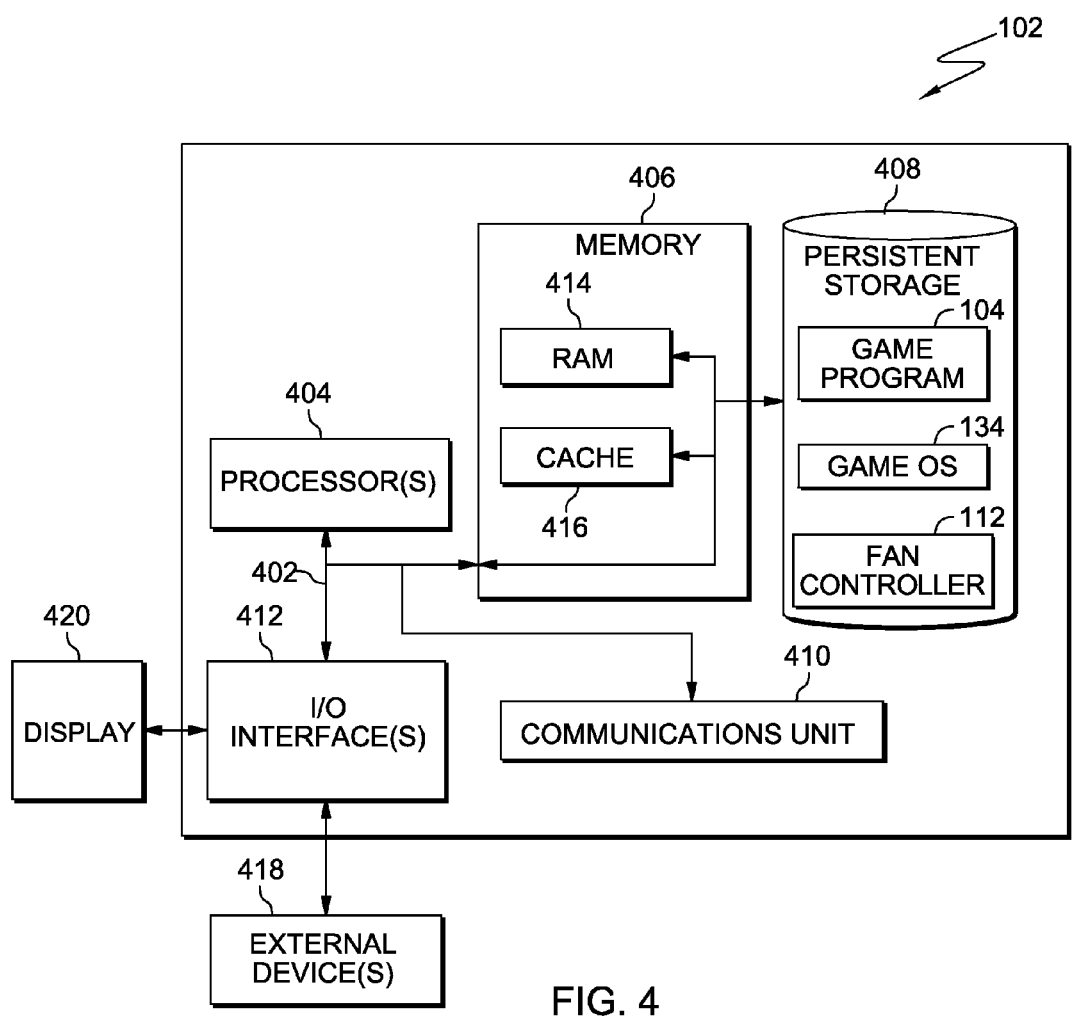
FIG. 4 depicts a block diagram of components of an illustrative computer system for implementing embodiments of the present invention.

FIG. 4 depicts a block diagram of components of game controller 102 in accordance with an illustrative embodiment of the present invention. It may be appreciated that FIG. 4 provides only an illustration of one implementation and does not imply any limitations with regard to the environments in which different embodiments may be implemented. Many modifications to the depicted environment may be made.

Game controller 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Game OS 134, game program 104, and fan controller 112 are stored in persistent storage 408 for execution and/or access by one or more of the respective computer processors 404 via one or more memories of memory 406. Game OS 134 has access to game program 104, and fan controller 112. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of game controller 102, and fan controller 112. In these examples, communications unit 410 includes one or more network interface cards. Communications unit 410 may provide communications through the use of either or both physical and wireless communications links. Game OS 134, game program 104, and fan controller 112 may be downloaded to persistent storage 408 through communications unit 410.

I/O interface(s) 412 allows for input and output of data with other devices that may be connected to game controller 102. For example, I/O interface 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., game OS 134, game program 104, and fan controller 112 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. An apparatus comprising:
a controller circuit, in communication with a gas blowing unit and a speaker, the controller circuit is operatively connected to an audio source of an entertainment device, and is configured to a) receive an audio input from the audio source, b) amplify a portion of a peak of the audio input that is above a pre-determined threshold, and c) send a signal that activates the gas blowing unit based on the amplified portion of the peak, such that the activation of the gas blowing unit results in a flow of gas of a first speed detectable by a user of the entertainment device.

2. The apparatus of claim 1, wherein the gas blowing unit includes at least one of the following: a fan, an air compressor with apparatus to produce a gas flow, or a gas tank with apparatus to produce a gas flow.

3. The apparatus of claim 1,
wherein the controller circuit is further configured to send a signal to the gas blowing unit based on an unamplified portion of the peak of the audio input, such that the gas blowing unit changes the flow of gas to a second speed that is lower than the first speed.

4. The apparatus of claim 1,
wherein the controller circuit is further configured to send the amplified portion of the peak to the speaker, the speaker issuing a sound representative of the audio input in response to receiving the amplified portion of the peak.

5. The apparatus of claim 1, wherein the controller circuit is further configured to increase a level of amplification of the amplified portion of the peak based, at least in part, on a sound level generated by the gas blowing unit.

6. The apparatus of claim 4,
wherein the controller circuit is further configured to synchronize the signal to the gas blowing unit with the sound issued from the speaker to simulate a gas speed sensation.

7. The apparatus of claim 1, wherein the controller circuit is further configured to cease amplifying the portion of the peak of the audio input if the portion of the peak is at or is below a pre-determined threshold.

8. A method for coordinating sensations of sound and gas flow based on audio input, the method comprising the steps of:
a computer receiving an audio input from an audio source, wherein the audio input includes an amplitude;
the computer determining that the amplitude of a portion of the audio input exceeds a pre-determined threshold and, in response:
the computer amplifying the determined amplitude of the portion of the audio input that is above the pre-determined threshold; and
the computer setting a speed for at least one fan gas blowing unit to a first value, wherein the first value is based, at least in part, on the amplified amplitude of the portion of the audio input.

9. The method of claim 8, wherein the computer receiving the audio input comprises:
the computer receiving the audio input from the audio source, including at least one of: an analog audio cable or wire, a wired digital connection, a wireless digital connection, or a second speaker transmitting an audio signal through air.

10. The method of claim 8, further comprising the step of:
the computer determining that the first value for the speed of the at least one gas blowing unit is at a maximum value, not based on the amplified amplitude of the portion of the audio input.

11. The method of claim 8, wherein the step of the computer amplifying the determined amplitude of the portion of the audio input that is above the pre-determined threshold, further comprises the step of:
the computer transmitting the amplified amplitude of the audio input to at least one speaker.

12. The method of claim 11, further comprising the steps of:
the computer determining that the amplitude of a portion of the audio input is at or below the pre-determined threshold and, in response:
the computer ceasing to amplify the determined amplitude of the portion of the audio input that is at or below the pre-determined threshold;
the computer setting the speed for the at least one gas blowing unit to a second value, wherein the second value is less than the first value; and
the computer ceasing the transmission of the audio input to the at least one speaker.

13. The method of claim 12, further comprising the step of:
the computer determining that the second value for the speed for the at least one gas blowing unit is zero.

14. The method of claim 11, further comprising the step of:
the computer synchronizing the transmission of the amplified amplitude of the portion of the audio input to the at least one speaker with setting the speed for the at least one gas blowing unit to the first value, wherein the transmission of the amplified amplitude of the portion of the audio input to the at least one speaker, and setting the speed for the at least one gas blowing unit to the first value are coordinated to simulate speed sensation using gas displacement.

15. A computer program product for coordinating sensations of sound and gas flow based on audio input, the computer program product comprising:
a computer readable storage medium and program instructions stored on the computer readable storage medium, the program instructions comprising:
program instructions to receive an audio input from an audio source, wherein the audio input includes an amplitude;
program instructions to determine that the amplitude of a portion of the audio input exceeds a pre-determined threshold and, in response:
program instructions to amplify the determined amplitude of the portion of the audio input that is above the pre-determined threshold; and
program instructions to set a speed for at least one gas blowing unit to a first value, wherein the first value is based, at least in part, on the amplified amplitude of the portion of the audio input.

16. The computer program product of claim 15, wherein program instructions to receive the audio input comprises:
program instructions to receive the audio input from the audio source, including at least one of: an analog audio cable or wire, a wired digital connection, a wireless digital connection, or a second speaker transmitting an audio signal through air.

17. The computer program product of claim 15, further comprising the step of:
program instructions to determine that the first value for the speed of the at least one gas blowing unit is at a maximum value, not based on the amplified amplitude of the portion of the audio input.

18. The computer program product of claim 15, wherein the step of program instructions to amplify the determined amplitude of the portion of the audio input that is above the pre-determined threshold, further comprises the step of:
program instructions to transmit the amplified amplitude of the audio input to at least one speaker.

19. The computer program product of claim 18, further comprising the steps of:
program instructions to determine that the amplitude of a portion of the audio input is at or below the pre-determined threshold and, in response:
program instructions to cease to amplify the determined amplitude of the portion of the audio input that is at or below the pre-determined threshold;
program instructions to set the speed for the at least one gas blowing unit to a second value, wherein the second value is less than the first value; and
program instructions to cease the transmission of the audio input to the at least one speaker.

20. The computer program product of claim 19, further comprising the step of:
program instructions to determine that the second value for the speed for the at least one gas blowing unit is zero.

* * * * *